Patented Nov. 2, 1937

2,097,482

UNITED STATES PATENT OFFICE 2,097,482

PROCESS FOR THE PRODUCTION OF BORON TRICHLORIDE

Harold C. Weber, Milton, Mass., and August Guyer, Zurich, Switzerland

No Drawing. Application October 1, 1935, Serial No. 43,048

8 Claims. (Cl. 23—205)

This invention relates to a process for producing a new and improved refrigerant and more particularly refers to a superior process for manufacturing boron trichloride and its use as a refrigerant.

Boron trichloride has heretofore been produced by various methods such as the direct union of chlorine and boron or by heating an intimate mixture of boron trioxide and charcoal in a current of chlorine gas. These prior art processes were exceedingly difficult to regulate and required such careful manipulation and extreme temperatures that the cost of boron trichloride practically prohibited its use in ordinary commercial practices. For example, when boron trichloride was produced by heating a mixture of boron trioxide and charcoal and passing chlorine gas therethrough a temperature of over 1000° C. was necessary to produce pure $BCl_3$. The difficulties of carrying out this reaction under such temperature conditions are practically insurmountable and readily explain the reason why the present price of boron trichloride is quite high.

Among these difficulties may be mentioned the fact that it is essential that no chlorine escape from the reaction mixture, and in order to prevent the escape of this gas the reaction mixture must be maintained under a temperature in the neighborhood of 1000–1200° C. If a lower temperature is used free chlorine escapes and dissolves in the condensed boron trichloride. Removal of this dissolved gas from the boron trichloride is extremely difficult and increases the cost of production tremendously. Moreover, any free chlorine, in the presence of carbon, readily unites with the carbon monoxide resulting from the reaction to produce phosgene. This latter material is a lethal gas which readily condenses in the boron trichloride. It boils so close to the boiling point of boron trichloride that it is quite doubtful whether any ordinary rectification could result in a complete separation of the two. The chemical similarity of boron trichloride and phosgene, furthermore, renders a chemical separation of the two practically impossible. A further difficulty is the fact that chlorine gas in the presence of volatile boron compounds attacks metals and even glass at the high reaction temperatures utilized. An additional objection results from the water which is associated with the boron compounds causing foaming and plugging of the apparatus.

A consideration of the foregoing renders self-evident the fact that no free chlorine must escape from the reaction zone. Until the present invention it was considered impossible to prevent the escape of this gas unless a temperature of more than 1000° C., and ordinarily 1100–1200° C., was utilized. As previously mentioned, a reaction of this type which requires such exceedingly high temperatures is surrounded by practically insurmountable difficulties. The natural result of these conditions was that boron trichloride was practically a laboratory curiosity, and while it has been proposed to use it as a polymerization and cracking catalyst in the petroleum industry its use in these or any other commercial operations was practically out of the question.

A careful study of the prior art led to the discovery that when boron trichloride was produced by heating an intimate mixture of boron trioxide (or borax) and charcoal in a current of chlorine gas the amount of charcoal present in the mixture was much too small. As a result the boron trioxide (or borax) fluxed over the surface of the charcoal and practically stopped the reaction unless the temperature was raised to such an extent that the fluxed material did not appreciably hinder free and intimate contact of the reactants. As previously mentioned, this temperature was over 1000° C. and was impracticable for all ordinary purposes. One feature of the present invention is, therefore, an increase in the amount of charcoal and/or in the surface thereof so that in carrying out the aforementioned reaction the fluxed boron compound (or compounds) will not appreciably hinder the reaction at temperatures considerably lower than 1000° C.

It is an object of the present invention to overcome the previously mentioned difficulties and the numerous additional difficulties which directly or indirectly result therefrom. A further object is to produce boron trichloride by a process which is simple and economical. A still further object is to produce boron trichloride by a process which does not depend upon the use of extremely high temperature. A still further object is to produce boron trichloride by a process wherein a temperature considerably lower than 1000° C. is possible and wherein free chlorine and/or phosgene does not escape from the reaction mixture, with its consequent disadvantages. A still further object is to utilize boron trichloride for many new and entirely unpredictable purposes. A still further object is to utilize boron trichloride as a refrigerant in compression, adsorption and absorption type refrigeration processes. Additional objects will become apparent from a consideration of the following description and claims.

These objects are attained according to the herein described invention wherein the surprising discovery is utilized that by properly proportioning the amount of oxygen-containing boron compound and carbonaceous material the temperature of the reaction of such materials with chlorine gas is considerably lower than 1000° C. In a more limited sense the invention comprises intimately mixing an oxygen-containing boron compound and material containing free carbon, the proportions of the aforesaid materials being such that upon fluxing the boron compound does not coat the carbon to such an extent that free and intimate contact of the reactants is hindered or prevented. This mixture is then heated to a temperature lower than 1000° C., and particularly within the range of about 400° C. to about 700° C., while passing therethrough chlorine gas. In its preferred embodiment this invention comprises intimately mixing boron trioxide and/or borax with free finely divided carbon, the amount by weight of boron trioxide and/or borax being about one-half the amount theoretically required, as indicated by the following equation:

$$B_2O_3 + 3C + 3Cl_2 = 3CO + 2BCl_3$$

heating the mixture to a temperature within the range of about 500 to about 600° C. and passing therethrough chlorine gas. In other words, twice as much carbon is used as is required in the preceding equation, the theoretical amounts of $B_2O_3$ and $Cl_2$ being used. The invention furthermore comprises the use of boron trichloride either alone or in conjunction with other refrigerants and refrigerating assistants in compression, adsorption and/or absorption type refrigeration processes.

Boron trichloride is a salt which is liquid at ordinary temperatures (boiling point 12.5° C. at an absolute pressure of one atmosphere). It does not attack glass, mercury or any of the common metals or metal alloys. It is stable at all ordinary temperatures up to at least 1000° C., and has a heat of vaporization at 10° C. of 45 calories per gram. It may be liquefied at ordinary condensing temperatures at a relatively low pressure so that a staged centrifugal pump directly connected to an electric motor may be used when this substance is made a refrigerant in a compression refrigeration system. The use of a centrifugal pump, of course, eliminates all pump lubrication, as well as packing and stuffing box troubles, thereby avoiding some of the most common disadvantages of many refrigerating processes now in use. Since this material may be liquefied by relatively low pressures it is also well adapted for use in absorption type refrigeration systems. Boron trichloride vapor is non-explosive, non-poisonous and non-toxic. These characteristics are of extreme importance in refrigerants since the danger of leaks, explosions, etc. is thereby entirely avoided. A further feature of great importance herein is the fact that if the refrigerator unit should develop a slight leak the boron trioxide formed on decomposition of the boron trichloride when it strikes the moist air will act as an effective and permanent seal. The aforementioned feature of self-sealing prevents the loss of the refrigerant with the consequent disadvantages resulting from repairing and recharging the refrigerating system.

The following advantages may also be mentioned in the case of absorption type refrigerators. Boron trichloride is readily dissolved in various solvents such as tin tetrachloride, tetrachlorethylene, pentachlorethane, chloroform, trichlorethylene, etc. All of these solvents, and the many related and/or equivalent solvents, yield boron trichloride unchanged when subjected to simple distillation, thus greatly simplifying the rectification process. Since boron trichloride has a vapor density about 58 times that of hydrogen it is ideally suited for use in absorption type refrigerators where a difference in vapor density between the normal atmosphere existing in the apparatus and the refrigerant laden atmosphere is necessary. As a result, air, nitrogen or similar light, inert gases may readily be used in an absorption type refrigerator having boron trichloride as a refrigerant, instead of the customary atmosphere of hydrogen. The foregoing are merely a few of the many advantages which boron trichloride possesses when used for refrigeration purposes.

With respect to the present improved process for producing boron trichloride it may be stated that the reaction is probably as follows:

$$B_2O_3 + 3C + 3Cl_2 = 2BCl_3 + 3CO$$

By properly proportioning the ratio of free carbon to oxygen-containing boron compound, particularly borax and boron trioxide, temperatures within the range of 400–700° are quite satisfactory. The proper amount of free carbon, as previously stated, is an amount sufficient to prevent the fluxed boron compound from appreciably hindering the reaction at temperatures lower than 1000° C. Ordinarily about twice as much carbon as indicated by the preceding equation is sufficient.

The following examples are illustrative of this process but are not intended as a limitation thereon:

*Example 1*

A mixture containing 56% by weight borax and 44% charcoal was heated to a temperature of 515° C.

Chlorine gas was passed therethrough resulting in the production of a pure boron trichloride free from chlorine and phosgene.

*Example 2*

A mixture containing 50% by weight boron trioxide and 50% by weight charcoal was heated to a temperature of about 550° C.

Free chlorine gas was passed therethrough.

The produce was a pure boron trichloride free from chlorine and phosgene.

The aforementioned examples were repeated using smaller percentages of carbon. Under such conditions it was necessary to increase the temperature in order to produce satisfactory results. As a general rule, as the amount of carbon decreases the temperature required increases rapidly.

The following examples illustrate the advantages of boron trichloride in absorption type refrigeration systems:

*Example A*

To tin tetrachloride was added up to 52.5% of boron trichloride.

Miscibility was complete and on simple distillation using a bath at 80° C. over 84% of the boron trichloride was recovered.

*Example B*

To tetrachlorethylene up to 68% of boron trichloride was added.

By simple distillation in a bath at 80° C., 78% of the boron trichloride was recovered.

Example C

To pentachlorethane was added up to 118% by weight of boron trichloride.

By simple distillation in a bath at 80° C., 90% of the boron trichloride was recovered.

Example D

To trichlorethylene was added up to 114% by weight of boron trichloride.

Upon simple distillation, using a bath temperature of 50° C., 70% of the boron trichloride was recovered.

Example E

Up to 108% by weight boron trichloride was added to chloroform.

Upon simple distillation at 45° C., a yield of 64% of the boron trichloride was recovered.

It is understood that the aforementioned examples are illustrative merely of the present invention, and are not intended as a limitation upon the scope thereof. The proportions of reactants, conditions under which the reaction is carried out, as well as the manner of utilizing this compound in refrigeration processes may be varied widely without departing from the scope of the present invention.

For example, in place of or in admixture with borax and/or boron trioxide other oxygen-containing boron compounds may be utilized. Instead of free carbon or in admixture therewith any material containing free carbon or yielding free carbon in the reaction zone which does not interfere with the resulting reaction may be used. The proportion of borax, boron trioxide or related substances to free carbon may be varied within rather wide limits. The boron compound, when expressed in terms of boron trioxide, should usually amount to from about 0.6 to about 1.5 times as much as the free carbon, these proportions being by weight. The particular proportion will, of course, depend to a great extent upon the type of oxygen-containing boron compound which is selected, and also the composition and state of subdivision of the carbon, carbon-containing or carbon yielding material.

For optimum results it is advisable to use either borax or boron trioxide or a mixture of the two and finely divided charcoal. The amount of borax or boron trioxide by weight, should then advisably be from about 80% to about 140% of the amount of free carbon. Under such conditions, the temperature of the reaction should preferably be within the range of from about 400 to about 700° C. Ordinarily, a temperature of about 500 to about 600° C. is satisfactory. However, it is to be understood that this invention in its broader scope comprises all workable temperatures lower than 1000° C., so long as this temperature is made possible by proportioning the amount of oxygen-containing boron compound to the amount of free carbon.

The use of boron trichloride in refrigeration systems is entirely new. As previously mentioned, it has numerous advantages over refrigerants now in use. It is adapted for use not only in the compression type of refrigeration system but also in the absorption and adsorption type of refrigeration systems. In all of these systems its physical and chemical characteristics render it particularly suitable. It is to be understood that this material may be used in conjunction with refrigerants and refrigeration assistants of the prior art. Preferably, however, in the compression type of refrigeration system boron trichloride is used alone. In the absorption and adsorption type of refrigeration systems it is also preferably used alone as a refrigerant, although it may be used in conjunction with various absorbing media and fixed gases.

For example, in the absorption refrigeration system boron trichloride may be used with tin tetrachloride and/or any of the other absorbing media directly or indirectly referred to herein. The atmosphere of this system may contain hydrogen, or may contain air, nitrogen, carbon monoxide and/or any other inert gases having a density appreciably lower than boron trichloride vapor. In the adsorption refrigeration system the adsorbing medium may be charcoal, silica gel or any of the well known and commonly used adsorbing materials.

A few of the many additional uses of boron trichloride which are included within the scope of the present invention are as follows:

1. As a dehydrating agent. Since boron trichloride is an effective dehydrating agent in the vapor phase it is of particular interest for this purpose.

2. As a catalyst in many reactions, particularly the Friedel and Crafts type of reaction. Intimate contact between a catalyst and the reactants is essential, and gaseous boron trichloride is practically ideal for this use.

3. As a carbonizing agent for the separation of cellulosic material from substances not attacked by dilute acids. For example, in the carbonizing of wool gaseous boron trichloride is of surprising efficacy.

4. As a source of dry hydrochloric acid. Boron trichloride is maintained at a low temperature to reduce vaporization, and water is added thereto resulting in the production of dry HCl.

5. As a source of boron. Boron trichloride is heated to a high temperature in an atmosphere of hydrogen or some other reducing medium to produce free boron.

6. As a self-sealing medium for porous welds. For example, in the sealing of vacuum tanks and equipment designed to produce or maintain a vacuum.

7. As a material for measuring temperatures, particularly within the range of −60° C. and +30° C. This use is of considerable value for accurate thermostatic control.

It is, of course, understood that the aforementioned are merely a representative few of the many uses of boron trichloride which are contemplated as within the scope of the present invention. Many additional uses of this material will be obvious to one familiar with the art, from a consideration of the foregoing instructions.

By means of the present invention an improved process for producing boron trichloride has been devised whereby this material may now be manufactured at a greatly reduced cost. In consequence thereof boron trichloride is removed from the list of laboratory curiosities and placed on the plane wherein it is feasible to utilize it in ordinary commercial operations. In particular it is advisable for use as a refrigerant and in this connection it is far superior to the great majority of prior art refrigerants. As a refrigerant this material possesses certain advantages which are possessed by none of the prior art refrigerants, and in addition possesses many of the advantages of prior art refrigerants.

As many apparently widely different embodiments of this invention may be made without departing from the spirit and scope thereof, it is to be understood that the invention is not limited to the specific embodiments thereof except as defined in the appended claims.

We claim:

1. A process for producing boron trichloride which comprises passing chlorine gas through a mixture of an oxygen-containing boron compound and free carbon heated to a temperature within the range of about 400° C. to about 700° C., the proportion by weight of oxygen-containing boron compound to free carbon being within the range of about 0.6 to about 1.5.

2. A process for producing boron trichloride which comprises passing chlorine gas through a mixture of an oxygen-containing boron compound and free carbon heated to a temperature within the range of about 400° C. to about 700° C., the amount and state of subdivision of the free carbon being such that upon fluxing the boron compound does not coat the carbon to such an extent that free and intimate contact of the reactants is appreciably hindered.

3. A process for producing boron trichloride which comprises passing chlorine gas through a mixture of boric oxide and free carbon heated to a temperature of about 550° C., the amount by weight of boric oxide being about equal to that of the free carbon.

4. A process for producing boron trichloride which comprises passing chlorine gas through a mixture of borax and free carbon heated to a temperature of about 515° C., the amount by weight of borax being about 125% of the amount by weight of free carbon.

5. A process for producing boron trichloride which comprises passing a chlorine-containing gas through a mixture of an oxygen-containing boron compound and a carbonaceous material, heated to a temperature below 1000° C., the amount and state of subdivision of the carbonaceous material being such that the boron compound upon fluxing does not coat it to such an extent that free and intimate contact of the reactants is appreciably hindered.

6. A process for producing boron trichloride which comprises passing chlorine gas through a mixture of an oxygen-containing boron compound and free carbon, heated to a temperature below 1000° C., the amount and state of subdivision of the free carbon being such that the boron compound upon fluxing does not coat it to such an extent that free and intimate contact of the reactants is appreciably hindered.

7. A process for producing boron trichloride which comprises passing chlorine gas through a mixture of borax and free carbon, heated to a temperature within the range of about 400° C. to about 700° C., the amount and state of subdivision of the free carbon being such that the borax upon fluxing does not coat it to such an extent that free and intimate contact of the reactants is appreciably hindered.

8. A process for producing boron trichloride which comprises passing chlorine gas through a mixture of boric oxide and free carbon, heated to a temperature within the range of about 400° C. to about 700° C., the amount and state of subdivision of the free carbon being such that the boric oxide upon fluxing does not coat it to such an extent that free and intimate contact of the reactants is appreciably hindered.

HAROLD C. WEBER.
AUGUST GUYER.